Aug. 5, 1952 — C. SUNDSTROM — 2,606,101
PROCESS AND APPARATUS FOR PROMPTLY DETECTING
CHLORINE GAS LEAKS FROM CHLORINE CONTAINERS
Filed Dec. 3, 1946 — 3 Sheets-Sheet 1
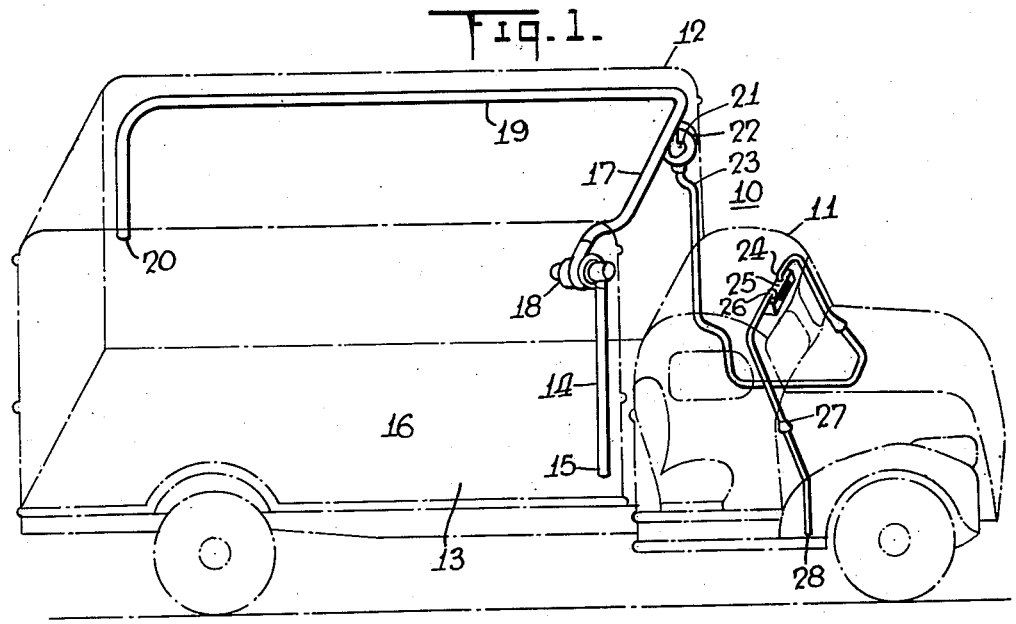
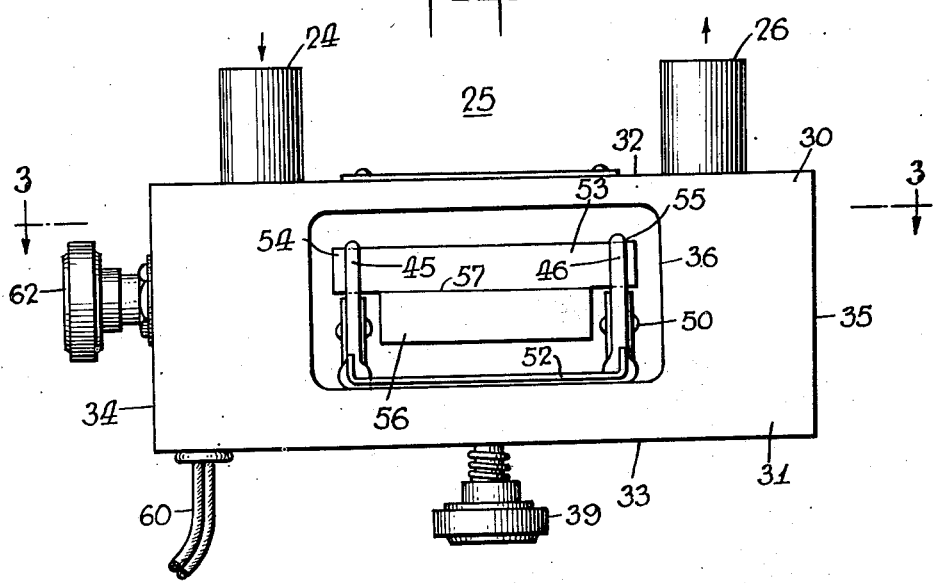
INVENTOR
Carl Sundstrom
BY
Benjamin Sweedler
ATTORNEY Aug. 5, 1952   C. SUNDSTROM   2,606,101
PROCESS AND APPARATUS FOR PROMPTLY DETECTING
CHLORINE GAS LEAKS FROM CHLORINE CONTAINERS
Filed Dec. 3, 1946   3 Sheets-Sheet 2

INVENTOR
Carl Sundstrom
BY
Benjamin Sweedler
ATTORNEY

Aug. 5, 1952 C. SUNDSTROM 2,606,101
PROCESS AND APPARATUS FOR PROMPTLY DETECTING
CHLORINE GAS LEAKS FROM CHLORINE CONTAINERS
Filed Dec. 3, 1946 3 Sheets-Sheet 3
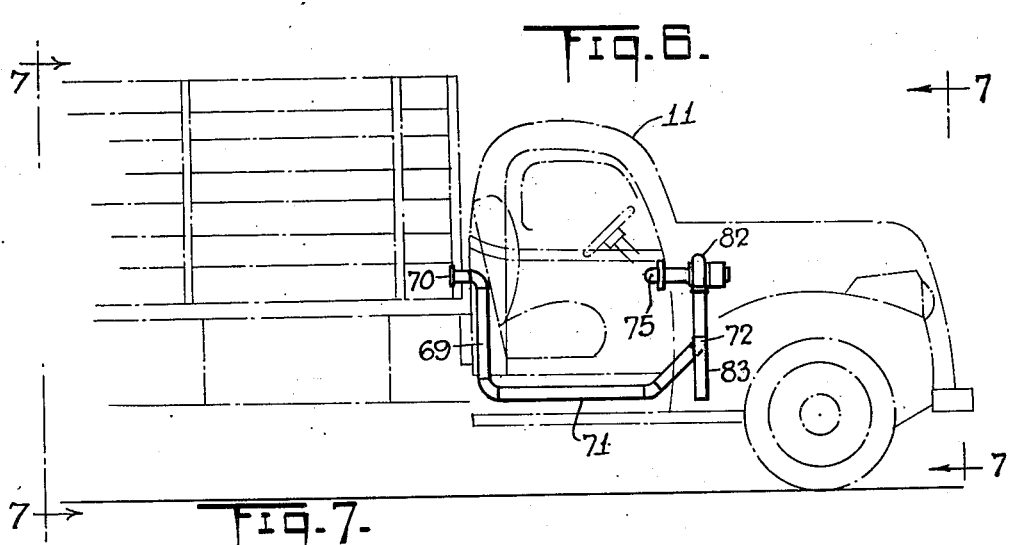
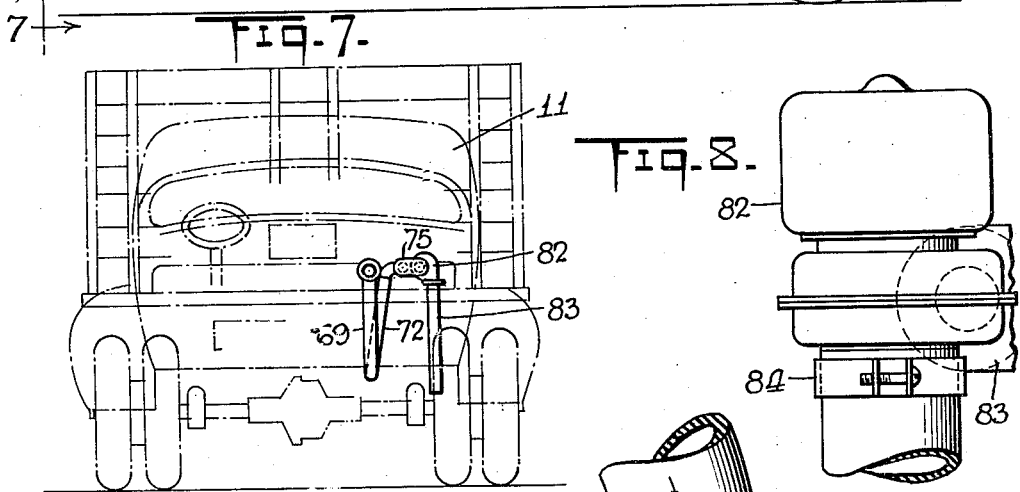
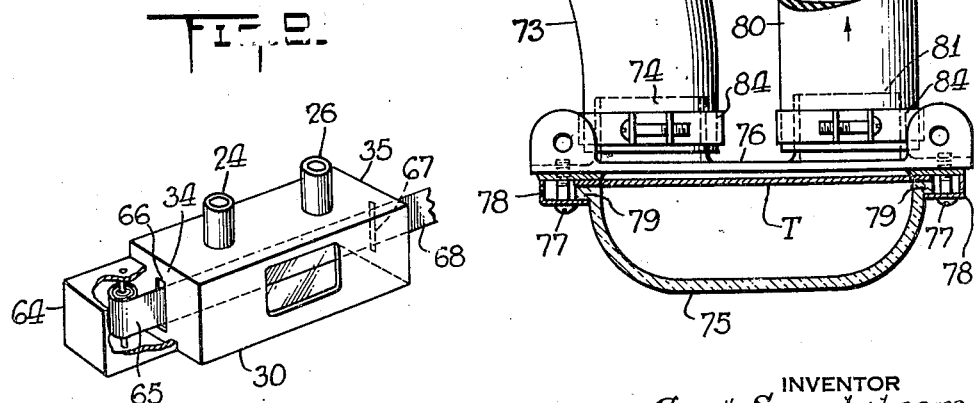
INVENTOR
Carl Sundstrom
BY
Benjamin Swiedler
ATTORNEY Patented Aug. 5, 1952

2,606,101

UNITED STATES PATENT OFFICE 2,606,101

PROCESS AND APPARATUS FOR PROMPTLY DETECTING CHLORINE GAS LEAKS FROM CHLORINE CONTAINERS

Carl Sundstrom, Syracuse, N. Y., assignor to Allied Chemical & Dye Corporation, a corporation of New York Application December 3, 1946, Serial No. 713,778

12 Claims. (Cl. 23—232)

This invention relates to the detection of low concentrations of chlorine gas in air, and more particularly to the prompt detection of chlorine leaks in cylinders and other containers in which chlorine is transported or stored.

Chlorine is usually loaded in metallic cylinders or other containers which are delivered by motor trucks, railroad cars and ships to the point of consumption or storage in warehouses for reshipment to the point of consumption. Occasionally during shipment or storage one or more of the containers may develop a leak. Such leak, if detected promptly, can readily be dealt with since while the concentration of the chlorine gas in the air is below 4 parts per million the chlorine gas is not unduly harmful for the short period of time required to repair the leak or to dispose of the leaking tank or cylinder. This is evident from Industrial Hygiene Manual, Air Service Command (1943) page 36, which notes that a concentration of chlorine gas in air of one part per million is the maximum amount to which a person can be safely exposed for long periods of time; a concentration of 3.5 parts per million is the lowest concentration having a detectable odor; a concentration of 4 parts per million is the maximum amount to which an individual may be exposed for short periods of time, of the order of from ½ to 1 hour; a concentration of 15.1 parts per million is the least quantity causing immediate irritation to the throat; a concentration of 30.2 parts per million is the least quantity causing coughing; and a concentration of 40 to 60 parts per million or more is dangerous for even short exposures. The attendant, once he discovers the leak, immediately positions the tank or cylinder so that chlorine gas rather than liquid escapes, thereby minimizing the build up of high concentrations of free chlorine in the surrounding atmosphere. From the same size orifice or opening the weight of chlorine issuing as liquid chlorine is about eight times that which would issue if the leak were a gas leak, each at the same cylinder pressure.

If, however, the gas leak is not detected promptly the chlorine concentration builds up and a serious accident may result. Thus, for example, on June 1, 1944, a motor truck driver delivering a load of chlorine cylinders in Brooklyn, New York, when stopped by a traffic light smelled chlorine and upon opening the closed motor truck body containing the chlorine cylinders the driver was almost completely overcome by fumes and more than four hundred people nearby were so seriously affected they required hospital treatment. If the driver could have detected the leak at the moment it occurred or before the chlorine concentration in the truck had exceeded four parts per million, he would have had a minor chlorine gas leak to handle instead of what turned out to be a major accident.

It is an object of this invention to provide a method for the prompt detection of chlorine gas leaks. Another object is to provide apparatus for practising such method, which apparatus is simple in design and construction and can readily be applied to (a) motor trucks for delivering chlorine cylinders and tanks, (b) storage warehouses in which such cylinders and tanks may be stored and (c) to other forms of transportation or storage employed in the handling of chlorine tanks and cylinders. Other objects and advantages of this invention will be apparent from the following detailed description thereof.

In accordance with this invention the air in the immediate vicinity of the base of the storage or transportation space (herein referred to as storage space) in which the chlorine containers are disposed is continuously withdrawn and passed through a chlorine detecting zone or device at all times visible to the truck driver or other person charged with the responsibility of determining the presence of a gas leak, which device contains a test strip which turns color upon contact with chlorine. Should a chlorine leak develop, the chlorine gas settling to the bottom of the storage space flows with the air stream through the detecting zone where it causes the before mentioned color change to take place so that it is immediately apparent to the observer that a chlorine leak has developed.

In a preferred embodiment of the invention a stream of air is recirculated through the storage space containing the chlorine containers. This recirculated stream is formed by continuously withdrawing air from the base of the storage space, passing a portion of this air through the detecting zone, discharging the remainder of the air stream at a point in this space remote from the point of air withdrawal, thereby maintaining the air in the storage space in circulation and insuring the prompt entry of chlorine escaping from a container into the circulating air stream, a portion of which passes through the chlorine detecting zone.

The test strip comprises an absorbent base, such as a fibrous base, preferably white paper free from size such as filter paper impregnated with a solution of orthotolidine containing a hygroscopic substance and preferably also containing an acid nonvolatile under the conditions of use and in amount sufficient to maintain the pH of the impregnating solution at less than 7. The hygroscopic substance used should not materially affect the property of orthotolidine or its salts to give a color reaction with chlorine. Glycerine is preferred as the hygroscopic substance but other hygroscopic substances such as calcium chloride solution or ethylene glycol may be used.

As the non-volatile acid, any acid which does not materially affect the property of orthotolidine or its salts to give a color reaction with chlorine and does not materially weaken the absorbent base may be employed. In general non-volatile, weak, non-oxidizing acids, such as phosphoric, lactic, tartaric and citric acid are preferred. These acids probably react with the orthotolidine to form salts which are as sensitive to chlorine as the unreacted orthotolidine. Orthophosphoric acid is particularly preferred because it was found to result in a test paper somewhat more sensitive and permanent than those produced with other acids. The term "orthotolidine" is used in the claims in a broad sense to include the salts of orthotolidine formed by reaction of the orthotolidine with the acid incorporated in the impregnating solution.

The test strip may be made by cutting paper, such as filter paper, or other fibrous material, such as cotton cloth, free of size into strips of the desired size, for example, approximately 3″ x 1″.

The impregnating liquid is prepared by adding the orthotolidine to a solvent, such as alcohol, stirring until the orthotolidine has dissolved or formed a fine suspension, and adding the hygroscopic agent and the acid while continuing the stirring until all the constituents have been dissolved or formed a fine suspension. In making the preferred impregnating solution or suspension, hereinafter referred to as the impregnataing liquid, from 1 to 15 grams, preferably 1 to 10 grams, of orthotolidine are added per liter of solvent. Each liter of solvent may contain from about 100 to 200 cc. of glycerine and 800 to 900 cc. of alcohol. The glycerine is a solvent for the orthotolidine and hence serves a dual function; viz., as a solvent and hygroscopic substance. The acid in amount to maintain the pH of the impregnating liquid at less than 7 is then added while stirring until all the constituents have been dissolved or form a fine suspension. One gram of orthophosphoric acid per liter of liquid is sufficient for this purpose.

The liquid thus prepared should be kept away from bright or direct light and desirably should be used immediately for the impregnation of the test strips. This may be effected by immersing each test strip in the solution or suspension, making certain that the strip is completely submerged. The wet strips are then dried, for example, by placing on clean paper towels and left there until they are completely dry. While drying, they should not be exposed to bright or direct light. When thoroughly dried, the strips should be placed in a stoppered amber bottle or other container which protects them from exposure to harmful light rays.

Only a portion of the surface of the test strip may be sensitized as hereinabove described, leaving a contiguous portion unsensitized so that when the sensitized portion is exposed to air containing chlorine gas it changes color which contrasts with the color of the unsensitized portion, especially near or at the line of separation between the sensitized and unsensitized portions so that initial color development is readily recognized. For example, approximately one-half of the test strip may be impregnated with the solution hereinabove described, leaving the remainder of the strip unsensitized. Desirably, however, the entire strip is impregnated, for example, by immersion in the solution as hereinabove described and thereafter a portion, say one-half, of the strip coated with a protective material to render the coated portion of the strip non-sensitive to chlorine gas in air. A thin paraffin coating will be found suitable for this purpose, the color of the paraffin coated portion being substantially the same as that of the sensitized portion so that the strip appears to have a uniform color. However, when the strip is exposed to air containing chlorine gas, only the sensitized portion turns bluish green, contrasting with the tint (nearly white) of the protected portion, especially near or at the line of separation between the sensitized and paraffin coated areas. The intensity of the green color increases with increase in time of exposure or with exposure to increasing concentrations of chlorine gas in air.

The protecting coating may be formed by applying a solution of paraffin of 50° to 52° C. melting point, for example, in a solvent such as benzol, by dipping the impregnated test strip in such solution or by brushing the coating solution onto the test strip. If the dipping procedure is followed, it will be found the paraffin solution will creep above the line of immersion by capillary action. A few tests will show the proper depth to which the test strip should be immersed to obtain uniform coating of the desired area of the strip. After the strips are dipped they should be stood on edge or suspended with the protected or coated edge down so that no excess paraffin solution will run on to the uncoated sensitized portion of the strips and the strips dried in this position. Since the resultant test strips are extremely sensitive to chlorine, they should be prepared in an atmosphere free of chlorine.

In the preferred embodiments illustrated on the drawings the invention is shown incorporated in a motor truck equipped with a chlorine detecting device and the present description will be confined to the present illustrated embodiments of the invention. It will be understood, however, that the novel features and improvements are susceptible to other applications, such, for example, as other modes of transportation including ships and railroad cars employed for shipping chlorine in tanks or cylinders, and to warehouses and other storage spaces in which chlorine containers may be stored. Hence, the scope of this invention is not confined to the embodiments hereindescribed.

In the accompanying drawings forming a part of this specification:

Figure 1 is a perspective view of a motor truck for delivering chlorine containers, which truck is equipped with a chlorine detector embodying this invention;

Figure 2 is a front elevational view of the chlorine detector housing;

Figure 6 is a fragmentary side elevation of a motor truck for delivering chlorine containers and illustrates a modified form of this invention;

Figure 7 is a rear elevational view taken in the direction shown by the arrows 7—7 of Figure 6;

Figure 8 is a fragmentary plan view partly in section on a greatly enlarged scale as compared with the showing of Figures 6 and 7, showing the chlorine detector housing of these figures and the piping and suction pump or blower associated therewith; and Figure 9 is a perspective view showing still another modified form of chlorine detector housing.

Figure 3:
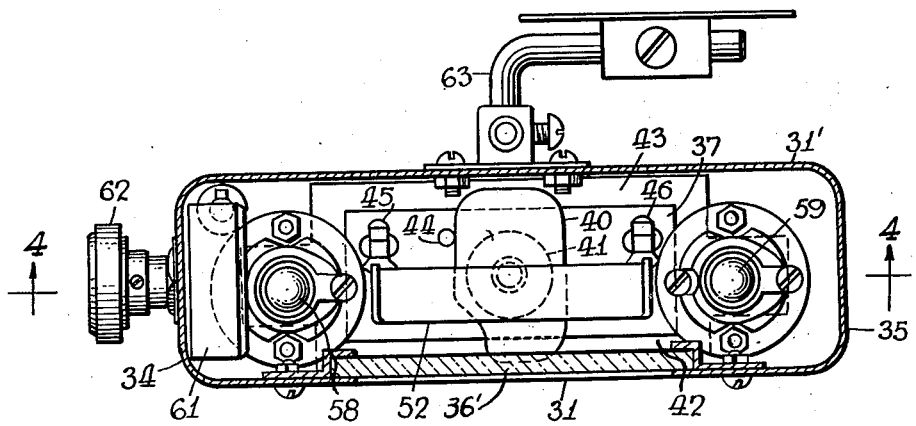
Figure 3 is a sectional plan view of the housing of Figure 2 taken in a plane passing through line 3—3 of Figure 2.

Referring to Figure 1 of the drawing, 10 indicates a motor truck having a cab 11 and closed body 12 providing a storage space 13 in which the chlorine containers, such as cylinders or tanks, are disposed for transportation. The closed body type of motor truck is shown in Figure 1 for purposes of exemplification only; other forms of trucks including trucks having open bodies covered with a tarpaulin, if desired, may be employed.

A conduit 14 is disposed within the closed body 12 preferably near the cab 11 with its inlet 15 positioned somewhat above the floor 16 of the motor truck 10, say about 6 inches above the floor. This conduit 14 communicates with a horizontally extending conduit 17. A blower or suction pump 18 is disposed in the connection between the conduits 14 and 17 to effect flow of air from near the floor of the truck through inlet 15 of conduit 14, conduit 17 into a communicating conduit 19 extending along the length of the truck and provided with a discharge outlet 20 at a point in the truck body remote from the inlet 15 of conduit 14. Thus the air within the truck body is maintained in a state of circulation. The parts hereinabove described may be so proportioned that about $\frac{1}{10}$ of the cubical content of the truck body or confined space in which the cylinders are stored is circulated per minute.

Communicating with the horizontal conduit 17 is an offtake 21 leading into a pump or blower 22, the discharge end of which leads into a conduit 23 of smaller cross sectional area than that of the conduits 14, 17 and 19. Conduit 23 leads into the inlet 24 of a chlorine detector 25 disposed in the cab 11 where it may at all times be observed by the driver. This detector is provided with an outlet 26 to which is connected a discharge or vent conduit 27 desirably leading from the outlet 26 to a point 28 beneath the cab floor. Pump 22 and the associated piping may be so constructed and proportioned that from about 3 to 5 cubic feet per minute of air is withdrawn from conduit 17 and forced through conduit 23, inlet 24, detector 25 and discharged through outlet 26 and discharge pipe 27 to the atmosphere.

Chlorine detector 25, as shown in Figures 2 to 5, inclusive, consists of a housing 30 having a front wall 31, rear wall 31', top wall 32, base 33 and sides 34, 35. It may be of plastic material such as methyl methacrylate, e. g., Lucite, or other material resistant to chlorine such, for example, as brass formed in one piece or by suitably securing the wall panels to form the housing. The inlet 24 and outlet 26 are disposed in the top wall 32. The front wall 31, if not of transparent material, is provided with a window portion 36 (Figure 2) covered by a glass 36' (Figure 3) or transparent plastic to maintain the interior of the housing substantially gas-tight.

Figure 4:
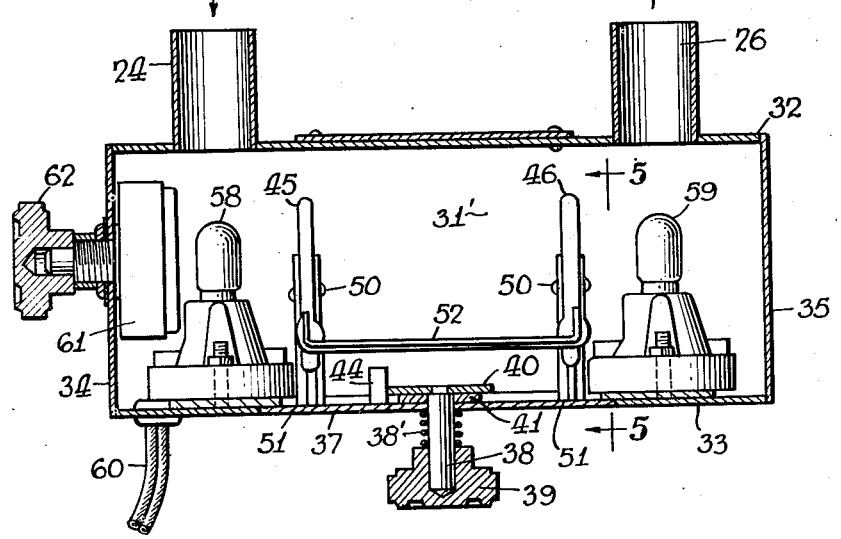
Figure 4 is a vertical sectional view taken in a plane passing through line 4—4 of Figure 3.

In the embodiment of the invention shown, the base 33 is provided with a removable plate 37 having centrally disposed for rotary movement therein a pin 38. A knob 39 is fixed on the end of pin 38 extending exteriorly of the housing 30. End of pin 38 disposed within the housing 30 has a latch member 40 keyed thereon, this latch being separated from the plate 37 by a washer 41 (Figure 4). Latch 40 is shaped as shown in Figure 3, and is so dimensioned that when in the position shown in Figure 3 the ends thereof extend beyond the plate 37 to engage side flanges 42, 43 defining the marginal sides of the base 33, maintaining the plate 37 in position within an opening in the base for the reception of plate 37; when the plate 37 is in this position shown in Figure 3 the base is substantially gas-tight. A pin 44 extends upwardly from the plate 37 and acts as a stop for latch 40. When this latch engages pin 44, as shown in Figure 3, plate 37 is locked in position within the housing and is maintained in this locked position by spring 38' disposed on pin 38 as shown in Figure 4. Upon manual rotation of latch 40 against the action of spring 38' by turning the knob 39 in a clockwise direction, the end portions of the latch 40 are moved out of contact with the flanges 42, 43 permitting withdrawal of the plate 37 and the clips hereinafter described mounted thereon from the housing 30.

Figure 5:
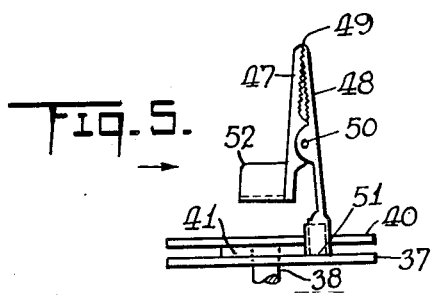
Figure 5 is a fragmentary side elevational view of a detail and shows one of the clips for mounting a test strip.

A pair of spaced clamps or clips 45, 46 are suitably mounted on plate 37. Each clip, as shown in Figure 5, comprises a short arm 47 and a long arm 48, the upper portions of these arms being serrated as at 49 to firmly engage the test strip. The arms 47 and 48 are pivoted at 50. The base of the long arms 48 of each clip is welded or otherwise suitably fastened to the plate 37, as at 51. Secured to the base of the shorter arm 47 of each clip, for example, by welding thereto, is a crossbar 52 bridging the space between the clips which may be of the order of 3 inches. By moving crossbar 52 in the direction of the arrow of Figure 5 both clips 45, 46 are simultaneously opened to permit the removal of the test strip and the insertion of a new strip. Upon release of pressure on the crossbar the clips, which have suitable springs (not shown) on their pivots for maintaining them in the closed position shown in Figure 5 are automatically closed to firmly grip the test strip. With the construction hereinabove described whenever it is desired to replace a test strip it is only necessary to turn the latch 40 by the knob 39, as hereinabove described, remove the assembly of plate 37 and associated clips 45, 46 from the housing, remove and replace the test strip, reinsert the assembly with the new strip in the housing and either turn or permit spring 38' to turn latch 40 so that it engages pin 44.

Desirably the test strip is formed of substantially T-shape comprising an upper portion 53 non-sensitive to chlorine, for example, this upper portion may be coated with paraffin as hereinabove described. The upper portion has extensions 54, 55 which are adapted to be gripped by the clips 45, 46 to maintain the test strip in vertical position within the housing spaced from the walls thereof so that the gas stream flowing through the housing passes in contact with the face of the strip. The strip is thus maintained in substantially the middle of the gas stream flowing through the housing opposite the window 36 where it may be observed. The test strip comprises a lower sensitized portion 56. Line 57 represents the line of demarcation between the sensitized lower portion 56 and the non-sensitized upper portion 53, at which line initial color development, taking place due to the presence of a trace of chlorine in the air stream passing through the housing, will be readily recognized.

A pair of electric lamps 58, 59 are suitably mounted in the housing on opposite sides of the test strip for controlling illumination of the test strip so that color development may be detected at night, in foggy or cloudy weather, or under atmospheric conditions rendering it necessary to illuminate the paper for purposes of observation. These lamps are provided with electric current through conductors 60 leading from an outside source of current such as the truck battery. The extent of illumination is controlled by a rheostat 61 in circuit with the lamps 58, 59 and operated by a knob or handle 62, as conventional.

A universal joint bracket 63 of any well known type is mounted on the back wall 31' of the housing 30 for mounting the housing within the truck cab 11 at a suitable location, this bracket permitting adjustment of the housing so that the test strip therein may be observed readily by the driver or other person within the cab.

In the modification of Figure 9 in lieu of a pair of clips for mounting the test strip in the form of separate strips each approximately 3 inches long and one inch wide, the housing 30 is provided at one end thereof with an auxiliary housing 64 in which is rotatably mounted a roll or spool of sensitized test material 65 which may be about one inch wide. One end of the roll of material 65 passes through a slot 66 in the end wall 34 of the housing 30, through the housing and emerges through slot 67. The walls of these slots are covered with rubber or other suitable flexible material. The test strip withdrawn from the roll is thus maintained between the end walls 34, 35 within the housing 30 in the direct path of flow of the air passing through the housing in position so that it can be observed through a window or transparent portion in the face of the housing. The flexible material covering the walls of the slots 66, 67 firmly engages the test strip so as to provide a gas-tight seal at these points.

When it is desired to have a fresh test strip disposed in the housing 30 in the modification of Figure 9, it is only necessary to unroll a fresh portion of the test strip by grasping the protruding end 68 of the strip and thereby remove from roll 65 a fresh portion which is automatically positioned in housing 30. The roll 65 may be of a length sufficient to supply fresh test strips for at least one month's operation of the detector. In general it is advisable to change the test strip within the housing when it becomes covered with dust or dirt due to the passage of air thereover from the truck body, or whenever the color of the strip changes due to the presence of chlorine in the air stream passed through the housing.

In the modification of Figures 6 to 8, inclusive, the air stream is sucked through the chlorine detector and not pumped therethrough as in the modification of Figure 1. Further this modification differs from that of Figure 1 in that the air within the truck body is not maintained in circulation therein.

In Figure 6 a conduit 69 has its inlet 70 disposed at a point just above the floor of the truck body and extends downwardly into a horizontal portion 71 disposed beneath the cab. This horizontal portion communicates with an upwardly extending portion 72 leading into portion 73 communicating with inlet 74 of the chlorine detector housing 75. Housing 75 is mounted on the dash board of the truck in Figure 6. It is bowl shaped and may be made of transparent plastic material resistant to chlorine. Rear wall 76 of this housing is suitably secured to this housing by threaded bolts 77 passing through openings in clips 78 engaging the flanges 79 on the bowl shaped member constituting the front of the housing. Bolts 77 are threaded into threaded openings in the rear wall 76. The test strip T is mounted in the housing between the flanges 79 and flanges on the rear wall 76 by being clamped therebetween. The test strip is thus spaced from the portion of the rear wall between the flanges thereon through which space air flows from inlet 74 in contact with the test strip T. To remove and replace the test strip it is only necessary to loosen bolts 77, remove the front of the housing, remove and replace the test strip T and clamp the front of the housing into the position shown in Figure 8 by the bolts 77.

A discharge conduit 80 leads from the outlet 81 of the housing to a suction pump 82 of any well known type, the discharge end of which communicates with a discharge pipe 83. Conduit 73 may be clamped to inlet 74, and conduit 80 to outlet 81 and to the inlet to the suction pump 82 by suitable collar clamps 84.

In operation it has been found that circulating about 50 cubic feet of air per minute for a storage space of 500 to 550 cubic feet with the passage of from 3 to 5 cubic feet per minute through the detector caused the test paper to indicate chlorine in 20 to 30 seconds after instantaneous release of 50 cc. chlorine gas (3.2 parts per million on basis of storage space) in the center of the storage space.

In the modification of Figures 6 and 7, which does not provide for circulation within the storage space, the detection may not be as prompt as in the modification of Figure 1, particularly if the leak is disposed within the storage space at a point remote from the inlet 70 to conduit 69, in view of the tendency of chlorine to form local high chlorine concentrations near the leaking container.

If this invention is used in a warehouse of large volumetric capacity the chlorine cylinders or tanks should be segregated in a storage space of not over about 1000 cubic feet each and each of these spaces provided with a detector preferably of the type shown in Figure 1 in which the air is recirculated through the storage space.

It will be noted this invention provides a method for the prompt detection of chlorine gas leaks. The test strip impregnated with orthotolidine, glycerine and orthophosphoric acid has been found sensitive to chlorine gas concentrations in air as low as 1.7 parts per million. It will be noted the apparatus of this invention, at little expense, can be applied to motor trucks, ships, railroad cars or storage warehouses employed for the transportation or storage of chlorine gas to promptly detect a leak.

Since certain changes in carrying out the above process and in the constructions set forth,

What is claimed is:

1. A process of promptly detecting chlorine gas leaks from chlorine containers, which comprises storing said chlorine containers in a confined zone, continuously withdrawing from the base portion of said confined zone a stream of air, and continuously passing the air stream thus withdrawn through a chlorine gas detecting zone having therein a test strip which changes color on contact with chlorine, the air stream passing over and in contact with said test strip, said test strip consisting essentially of an absorbent base impregnated with a solution containing orthotolidine, a liquid hygroscopic material in which orthotolidine is soluble and a weak, non-oxidizing acid substantially non-volatile at atmospheric temperatures and pressure which acid does not affect the property of orthotolidine to give a color reaction with chlorine and does not materially weaken the absorbent base, said acid being present in amount sufficient to maintain said absorbent base at a pH of less than 7.

2. A process of promptly detecting chlorine gas leaks from chlorine containers, which comprises storing said chlorine containers in a confined zone, continuously withdrawing from the base portion of said confined zone a stream of air, and continuously passing the air stream thus withdrawn through a chlorine gas detecting zone having therein a test strip which changes color on contact with chlorine, the air stream passing over and in contact with said test strip, said test strip consisting essentially of an absorbent base impregnated with a solution containing orthotolidine, glycerin and orthophosphoric acid.

3. A process of promptly detecting chlorine gas leaks from chlorine containers maintained in a confined storage zone, which comprises continuously circulating the air in the storage zone by withdrawing air from the base of said storage zone, and continuously discharging a portion of the air thus withdrawn into said storage zone at a point remote from the point of air withdrawal therefrom, continuously discharging the remainder of the air thus withdrawn through a chlorine gas detecting zone having therein a test strip which changes color on contact with the chlorine, the air stream being passed over and in contact with said test strip.

4. A process as defined in claim 3, in which the test strip consists essentially of an absorbent base impregnated with a solution containing orthotolidine, a liquid hygroscopic material in which orthotolidine is soluble and a weak, non-oxidizing acid substantially non-volatile at atmospheric temperatures and pressure which acid does not affect the property of orthotolidine to give a color reaction with chlorine and does not materially weaken the absorbent base, said acid being present in amount sufficient to maintain said absorbent base at a pH of less than 7.

5. A process as defined in claim 3, in which said test strip consists essentially of an absorbent base impregnated with a solution containing orthotolidine, glycerin and orthophosphoric acid.

6. A process of promptly detecting chlorine gas leaks from chlorine containers during the course of the transportation of said containers in a confined storage zone, which process comprises continuously withdrawing air from the base portion of said confined storage zone, continuously passing the air thus withdrawn through a chlorine gas detecting zone having therein a test strip impregnated with a solution containing orthotolidine, a liquid hygroscopic material in which the orthotolidine is soluble and a weak, non-oxidizing acid substantially non-volatile at atmospheric temperatures and pressure which acid does not affect the property of orthotolidine to give a color reaction with chlorine and does not materially weaken the absorbent base, said acid being present in amount sufficient to maintain the test strip at a pH of less than 7, the air stream being passed over and in contact with said test strip.

7. A process of promptly detecting chlorine gas leaks from chlorine containers transported in a motor vehicle having a storage zone in which the chlorine containers are disposed and having an operator's cab provided with a chlorine detector having therein a test strip which changes color on contact with chlorine, which process comprises circulating the air in said storage zone by withdrawing air from the base of said storage zone and continuously discharging a portion of the air thus withdrawn into said storage zone at a point remote from the point of air withdrawal, and continuously passing the remainder of the air thus withdrawn through the chlorine detector in said cab so that should a chlorine leak develop it is immediately apparent to an operator in said cab.

8. A process as defined in claim 7, in which said test strip consists essentially of an absorbent base impregnated with a solution containing orthotolidine, a liquid hygroscopic material in which orthotolidine is soluble and a weak, non-oxidizing acid substantially non-volatile at atmospheric temperatures and pressure which acid does not affect the property of orthotolidine to give a color reaction with chlorine and does not materially weaken the absorbent base, said acid being present in amount sufficient to maintain said absorbent base at a pH of less than 7.

9. A process as defined in claim 7, in which the test strip consists essentially of an absorbent base impregnated with a solution containing orthotolidine, glycerin and orthophosphoric acid.

10. An apparatus for promptly detecting chlorine gas leaks in a motor truck for transporting chlorine containers comprising, in combination, a storage chamber for the chlorine containers, a housing having an inlet and an outlet and disposed in the cab of the truck, means in said housing for supporting a test strip therein spaced from the walls thereof so that gas passing through said housing passes in contact with said test strip, a conduit leading from near the floor of said storage chamber to said inlet, a discharge conduit leading from said outlet, means for effecting a flow of air through said conduit leading from near the floor of said storage chamber into and through said housing and through said discharge conduit, and means for effecting circulation of air within the storage chamber of said truck.

11. A motor truck for delivering chlorine containers comprising, in combination, a closed body providing a storage chamber for said chlorine containers, a housing disposed in the cab of the truck, said housing having an inlet and an outlet, a pair of clamps in said housing for maintaining a test strip therein spaced from the walls of said housing so that gas passing through said housing contacts said test strip, said housing having a window portion through which the test strip within said housing may be observed, a conduit leading from a point just above the floor of said closed body to said inlet, a conduit communicating with said first mentioned conduit leading to a point within said closed body remote from the inlet to the first named conduit, means for effecting withdrawal of air through the first named conduit, and passing a portion of the air thus withdrawn through the second named conduit to effect circulation of air within the closed body of the truck, means for passing a portion of the air thus withdrawn through said inlet into said housing, and another conduit leading from said outlet for discharging the air passed through said housing to the atmosphere.

12. A chlorine detector comprising an elongated housing consisting of a front, rear and bottom wall, said front wall having a transparent portion, said rear wall being provided with means for mounting the housing and said bottom wall having a removable plate, a pair of spaced clamps on said removable plate for mounting a test strip in spaced relation to the walls of the housing, one of said clamps being disposed near one end of said plate and the other near the opposite end of said plate, and latch mechanism for locking said plate in position and permitting the ready removal thereof to replace the test strip.

CARL SUNDSTROM.

REFERENCES CITED

The following references are of record in the file of this patent:

UNITED STATES PATENTS

| Number | Name | Date |
|---|---|---|
| 1,146,531 | Smyly | July 13, 1915 |
| 1,154,128 | Rich | Sept. 21, 1915 |
| 1,512,893 | Fulweiler | Oct. 21, 1924 |
| 1,643,155 | Eisenschitz | Sept. 20, 1927 |
| 1,977,002 | Ljunggren | Oct. 16, 1934 |
| 2,077,538 | Wait | Apr. 20, 1937 |
| 2,113,063 | Stryker et al. | Apr. 5, 1938 |
| 2,122,070 | Quick | June 28, 1938 |
| 2,176,462 | McAllister | Oct. 17, 1939 |
| 2,178,550 | Acree | Nov. 7, 1939 |
| 2,234,499 | McAllister | Mar. 11, 1941 |
| 2,249,867 | Snelling | July 22, 1941 |
| 2,290,436 | Kamlet | July 21, 1942 |
| 2,290,473 | Kalmar et al. | July 21, 1942 |
| 2,314,336 | Goodale | Mar. 23, 1943 |
| 2,345,090 | Brace | Mar. 28, 1944 |
| 2,356,845 | Hines | Aug. 29, 1944 |
| 2,385,471 | Scharer | Sept. 25, 1945 |
| 2,400,923 | Farr | May 28, 1946 |
| 2,412,146 | Hansen | Dec. 2, 1946 |

FOREIGN PATENTS

| Number | Country | Date |
|---|---|---|
| 264,820 | Great Britain | Dec. 1, 1927 |
| 426,378 | Great Britain | Apr. 2, 1935 |
| 639,177 | Germany | Nov. 12, 1936 |

OTHER REFERENCES

Ellms and Houser: "J. Ind. Eng. Chem.," vol. 5, pages 915–917, (1913).

Altieri: "Gas Analysis and Testing of Gaseous Materials," pages 277, 1945. Published by American Gas Association, N. Y. C.